3,154,573
PROCESS FOR PREPARING FLUORINATED
DINITRILES
Harry J. Cenci, Warminister, Pa., assignor to Rohm &
Haas Company, Philadelphia, Pa., a corporation of
Delaware
No Drawing. Filed June 5, 1961, Ser. No. 114,640
5 Claims. (Cl. 260—465.7)

This invention deals with specific fluorinated dinitriles as new compositions of matter. It further deals with a method for the preparation of these specific fluorinated dinitriles.

The compounds of the present invention may be represented by the formula $$NC(F)C=C(X)CN$$

in which X is a halogen having an atomic weight of about 19 to about 35.5, i.e., fluorine or chlorine. More specifically, this invention deals with 1,2-difluoro-1,2-dicyanoethene and 1-fluoro-2-chloro-1,2-dicyanoethene. The above compounds are obtained as cis and trans isomers, both forms of which are useful for the purposes of this invention.

The compounds of the present invention are prepared by reacting 1,2-dichloro-1,2-dicyanoethene with an alkali metal or alkaline earth fluoride in the presence of an inert, organic, polar solvent. It is preferred that the solvent have a high boiling point, such as above about 90° C. at 25 mm. absolute pressure. Suitable solvents include tetraethylene glycol dimethyl ether, diphenyl ether, and tetramethylene sulfone. The preferred solvent is tetramethylene sulfone. Suitable fluorides for the present reaction include potassium fluoride, sodium fluoride, calcium fluoride, barium fluoride, and the like, including mixtures thereof. The preferred reactant is postassium fluoride.

The present reaction is conducted in the temperature range of about 140° to 250° C., preferably 160° to 200° C.

It is essential to the success of the present invention to remove the products substantially as they are formed. Otherwise, if the products are allowed to remain in the reaction system for an appreciable period of time, undesired degradations occur and tarry residues develop. Accordingly, the products are removed from the reaction medium at a rate substantially the same as the rate of reaction. The products are readily removed from the reaction medium by maintaining the pressure of the reaction system at suitable subatmospheric levels, as will be clear to one skilled in the art. Absolute subatmospheric pressures of down to about 20 to 40 mm. are convenient and advantageous. The products are thereby substantially instantaneously after formation removed from the reaction system in good yield, high purity and at a relatively rapid rate. The addition of small amounts of potassium acid fluoride to the reaction medium is somewhat advantageous in keeping the reaction mixture light in color.

The aforementioned fluorinated cyanoethylenes are obtained as mixtures in the present reaction, that is, both the 1,2-difluoro-1,2,dicyanoethene and 1-fluoro-2-chloro-1,2-dicyanoethene are obtained. Also each of these is present in the form of cis and trans isomers. It is possible to separate the 1-fluoro-2-chloro-1,2-dicyanoethene from the 1,2-difluoro-1,2-dicyanoethene by distillation. The cis and trans isomers of each product cannot be resolved by usual distillation but vapor phase chromatography indicates that these isomers are present in approximately equal amounts.

The present invention, of course, is to be construed to encompass the cis and trans isomers of each of the aforementioned fluorinated cyanoethylenes. Generally speaking, the lower reaction temperatures favor the formation of higher yields of the monofluorinated compound, whereas the higher reaction temperatures favor the formation of higher yields of the difluorinated compound. The difluorinated product is somewhat preferred because it has significantly greater activity in the field of utility discussed hereinafter.

The preferred way of conducting the present reaction is by adding a solution of 1,2-dichloro-1,2-dicyanoethene in a solvent, such as tetramethylene sulfone, to a suspension of the selected fluoride, such as potassium fluoride, in the same agent that was the solvent for the 1,2-dichloro-1,2-dicyanoethene, such as tetramethylene sulfone. Generally, the agent that is a solvent for the 1,2-dichloro-1,2-dicyanoethene will not be a solvent for the metal fluoride. Hence, the fluoride will be present in a suspension or slurry.

The products of this invention are useful as aquatic herbicides, particularly for duckweed when used in standard amounts and according to standard methods. They are also useful as fungicides, particularly when applied against *Monilinia fructicola* and *Stemphylium sarcinaeforme* in amounts of about 0.0001 to 0.1% by weight when employed and evaluated according to standard techniques. The present products are also useful in controlling *Fusarium oxysporum* f. *cubense*. Particularly effective in this respect is 1,2-difluoro-1,2-dicyanoethene, which gives a complete kill at concentrations of 9 parts per million and less. This is surprising since the corresponding dichlorinated reactant is not half as active in this regard. The present compounds are useful as chemical intermediates; for example, they may be hydrolyzed to form the corresponding acids and then esterified to form compounds that are useful as pesticides. They may be copolymerized with styrene, α-methyl styrene, methyl methacrylate and acrylonitrile, and the like, to form useful products.

The compounds of the present invention may be more fully understood from the following examples, which are offered by way of illustration and not by way of limitation. Parts by weight are used throughout.

*Example 1*

Into a 500 ml. three-necked flask there is charged 163 parts of potassium fluoride. The flask is placed on a Rinco rotary evaporator and dried at about 50° C. at 0.5 mm. absolute pressure for several hours. To the dried potassium fluoride (161 parts, 2.78 moles) there is added 147 parts of dry tetramethylene sulfone. The reaction flask is equipped with a stirrer, thermometer, addition funnel, and an 8-inch Vigreux column attached to a distilling head. To the stirred reaction mixture at 165° C. at 38 mm. absolute pressure, there is added over a 3-hour period a solution of 147 parts (1.0 mole) of 1,2-dichloro-1,2-dicyanoethene in 89 parts of tetramethylene sulfone with simultaneous removal of product as it forms. A total of 80.3 parts of distillate is collected. Fractional distillation through an 18-inch spinning band column gives 1,2-difluoro-1,2-dicyanoethene, B.P. 82.5° C.; $n_D^{22}$ 1.3895. (Analysis calculated for $C_4N_2F_2$; carbon 42.12%, nitrogen 24.56%, fluorine 33.32%.—Found: carbon 42.23%, nitrogen 23.81, fluorine 33.10% and 1-fluoro-2-chloro-1,2-dicyanoethene, B.P. 125° C.; $n_D^{22}$ 1.4505.) (Analysis calculated for $C_4N_2ClF$: carbon 36.81%, nitrogen 21.47%, chlorine 27.17%, fluorine 14.56%.—Found: carbon 36.87%, nitrogen 21.41%, chlorine 27.41%, fluorine 14.71%.)

*Example 2*

Into a 500 ml. three-necked flask equipped with a stirrer, thermometer, addition funnel and an 8-inch Vigreux column attached to a distilling head there are charged 80.6 parts (1.39 mole) of dry potassium fluoride, 7.8 parts (0.10 mole) of potassium acid fluoride and 100 parts of tetramethylene sulfone. The reaction mixture is stirred and heated at 140° C. at 20 mm. absolute pressure and a solution of 73.5 parts (0.50 mole) of 1,2-dichloro-1,2-dicyanoethene in 100 parts of tetramethylene sulfone is added over a 1¼ hour period with simultaneous removal of product. The distillate collected in a cooled receiver weighs 46.3 parts and gas liquid chromatography indicates that it contains 16.9 parts (23%) of unreacted 1,2-dichloro-1,2-dicyanoethene, 25.2 parts (39%) of 1-fluoro-2-chloro-1,2-dicyanoethene and 3.9 parts (7%) of 1,2-difluoro-1,2-dicyanoethene.

Using the same equipment and the same amounts of reactants as above except that the reaction is run at 195° C. at 90 mm. absolute pressure, there is obtained 38.8 parts of distillate. Vapor phase chromatography indicates that it consists of 13.9 parts (19%) of 1,2-dichloro-1,2-dicyanoethene, 12.8 parts (20%) of 1-fluoro-2-chloro-1,2-dicyanoethene and 12.0 parts (21%) of 1,2-difluoro-1,2-dicyanoethene.

The pure compounds are isolated from the crude distillate by fractional distillation.

I claim:

1. A method for the preparation of the compound having the formula $$NC(F)C=C(X)CN$$

in which X is a halogen selected from the group consisting of fluorine and chlorine, which comprises reacting 1,2-dichloro-1,2-dicyanoethene with a member from the group consisting of an alkali metal fluoride and alkaline earth fluoride in the presence of an inert, organic, polar solvent that has a boiling point above about 90° C. at 25 mm. absolute pressure at a temperature of about 140° to 250° C. and removing the product from the reaction medium.

2. A method for the preparation of the compound having the formula $$NC(F)C=C(X)CN$$

in which X is a halogen selected from the group consisting of fluorine and chlorine, which comprises reacting 1,2-dichloro-1,2-dicyanoethene with a member from the group consisting of an alkali metal fluoride and alkaline earth fluoride in the presence of tetramethylene sulfone at a temperature of about 160° to 200° C. and removing the product from the reaction medium.

3. A method for the preparation of the compound having the formula $$NC(F)C=C(X)CN$$

in which X is a halogen selected from the group consisting of fluorine and chlorine, which comprises reacting 1,2-dichloro-1,2-dicyanoethene with a member from the group consisting of an alkali metal fluoride and alkaline earth fluoride in the presence of tetramethylene sulfone at a temperature of 160° to 200° C. and removing the product at subatmospheric pressures substantially as it is formed.

4. A method according to claim 3 in which the alkali metal fluoride is potassium fluoride.

5. A method according to claim 3 in which the reaction is conducted by adding a solution of tetramethylene sulfone and 1,2-dichloro-1,2-dicyanoethene to a suspension of potassium fluoride in tetramethylene sulfone.

References Cited in the file of this patent

UNITED STATES PATENTS

| 2,465,318 | Seymour | Mar. 22, 1949 |
| 2,782,218 | Drysdale | Feb. 19, 1957 |
| 3,057,875 | Brown | Oct. 9, 1962 |

OTHER REFERENCES

Mommaerts: Chemical Abstracts, vol. 40, 1946, page 4670.